United States Patent Office 2,869,579
Patented Jan. 20, 1959

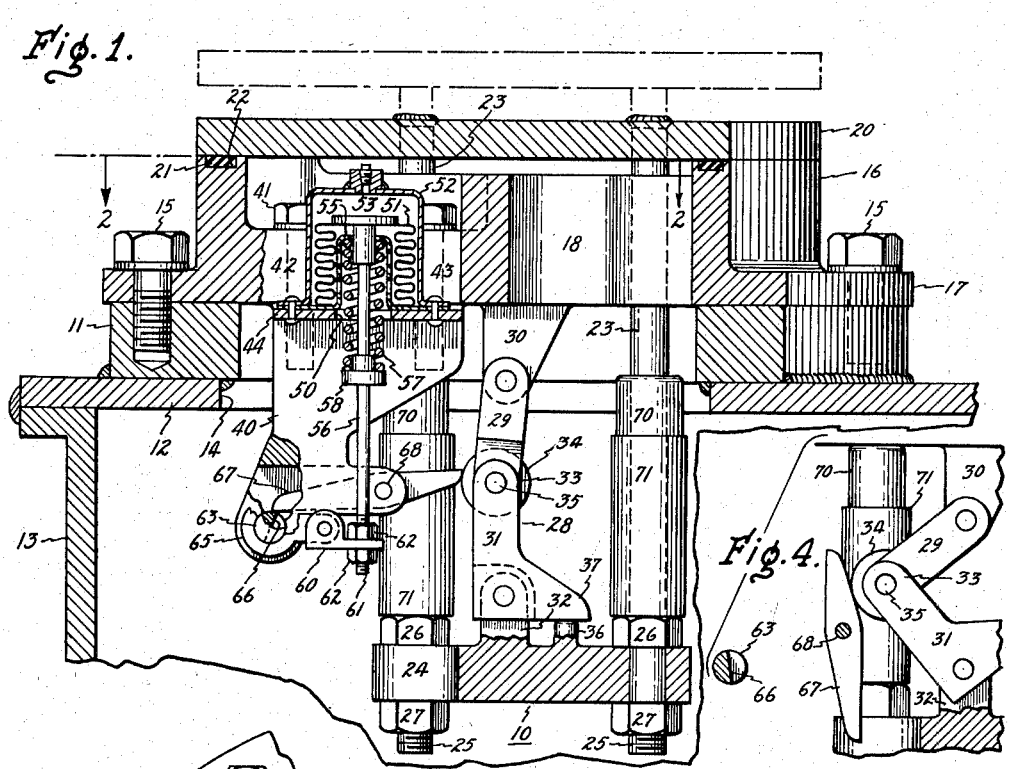

2,869,579

MECHANICAL PRESSURE RELIEF DEVICE

Stanley H. Wilk and Raymond Cuzzone, Pittsfield, Mass., assignors to General Electric Company, a corporation of New York Application May 10, 1956, Serial No. 584,015

9 Claims. (Cl. 137—467)

This invention relates to pressure relief devices, and more in particular to an improved pressure relief device adapted for the automatic releasing of excess pressure from enclosed electrical apparatus such as transformers or the like. It will be understood, however, that the invention may also be employed for relieving pressure on other types of enclosures without departing from the spirit or scope thereof.

Totally enclosed electrical apparatus, such as power transformers or the like, are occasionally subjected to high internal pressure resulting from certain fault conditions. In order to prevent structural damage to the equipment, it is desirable to provide means for releasing internal pressure. In order to provide effective protection for the apparatus, it is necessary that the pressure relief device operate consistently at the same pressure, and that the operation is not affected by gripping of aged gaskets. To ensure accurate operation, it is also desirable that a minimum number of components be employed in the device, and that the operation of the device be dependent to a minimum upon friction between moving parts. It is also desirable that the resetting of the relief device involve as simple a procedure as possible.

It is therefore an object of this invention to provide an improved mechanical pressure relief device.

It is also an object to provide an improved mechanical pressure relief device characterized by having a minimum of component parts, and in which the operation is dependent to a minimum extent upon frictional contact between the component parts.

A further object of this invention is to provide a mechanical pressure relief device requiring a minimum number of steps for resetting thereof.

It is a still further object to provide a mechanical pressure relief device wherein operation of the device is accomplished by rotation of a shaft means in response to pressure within an enclosure.

Briefly stated, in accordance with one embodiment of this invention, we provide a pressure relief device having a cover plate which releasably covers the aperture of an enclosure. Web means are rigidly affixed to the wall of the enclosure, and extend across the aperture. The means such as a plate or spider is provided inside of the enclosure, and studs extend from the tie means to the cover plate through the web. A toggle is provided extending between the tie means and the web internally of the enclosure, and means are provided to prevent collapse of the toggle. The toggle is arranged so that when expanded it holds the cover plate over the enclosure apparatus, and pressure within the enclosure on the cover plate tends to collapse the toggle. Pressure responsive means, such as a metallic bellows, is provided, and the pressure responsive means is connected to a shaft in such a manner that variation in pressure within the enclosure results in rotation of the shaft. The shaft has a non-circular portion, such as a portion with a segment removed, and a pivoted arm extends between the non-circular portion of the shaft and the knee of the toggle. The pivoted arm is arranged so that toggle collapsing forces provide a moment on the pivoted arm, and this moment is releasably restrained by the bearing of the pivoted arm against the non-circular portion of the shaft. Upon rotation of the shaft to a predetermined position, the pivoted arm is permitted to slip past the shaft, thereby resulting in rotation of the pivoted arm and consequent release of the toggle. The collapsing of the toggle permits the internal pressure of the enclosure to force the cover outwardly, thereby permitting free passage of the enclosure fluid through the aperture.

While the specification concludes with claims particularly pointing out and distinctly claiming the subject matter which we regard as our invention, it is believed that the invention will be better understood from the following description taken in connection with the accompanying drawing in which:

Fig. 1 is a cross sectional view of a mechanical pressure relief device according to this invention, Fig. 2 is a view of the mechanical pressure relief device of Fig. 1 taken along the lines 2—2, Fig. 3 is a perspective enlarged partially cross sectional view of a portion of the mechanical pressure relief device of Fig. 1 and illustrating the means for releasing the toggle, and Fig. 4 is an enlarged view of a portion of the relief device of Fig. 1 illustrating the toggle in its released position.

Referring now to the drawing, and more in particular to Fig. 1, therein is illustrated a mechanical pressure relief device 10 mounted on a flange 11 extending from the wall 12 of an enclosure 13 such as the tank of electrical apparatus. The flange 11 surrounds an aperture 14 extending through the wall 12 of the apparatus. A mechanical pressure relief device 10 is bolted to the flange 11 externally of the enclosure 13 by means of a plurality of bolts 15.

The relief device 10 is comprised of an annular member 16 having a flange 17, the annular member 16 being held against the flange 11 by the bolts 15 which pass through the flange 17. The annular member 16 has a central web 18 extending across the aperture 14. The web, which is more clearly illustrated in Fig. 2, is illustrated as having three arms joined at the axis of the annular member 16. It will be obvious, however, that other configurations of webs may be employed.

A cover plate 20 (Fig. 1) is provided over the open end of the annular member 16, and gasket means 21 may be provided in an annular groove 22 in the open end of the annular member 16 in order to provide a seal between the cover plate and the annular member.

Studs 23 rigidly affixed to the cover plate 20 extend through the web 18 and terminate within the enclosure 13. As illustrated in Figs. 1 and 2, the studs 23 may pass through holes drilled in the arms of the web 18 in order that the cover plate 20 is aligned with respect to the annular member 16 and aperture 14.

Tie means 24 is held on the threaded ends 25 of the studs 23 within the enclosure 13 by means of nuts 26 threaded on the studs 23 on the side of the tie means 24 toward the cover plate 20 and nuts 27 on the side of the tie means 24 away from the cover plate 20. The nuts 26 may be pinned in place, and serve to limit the compression of gasket 21.

The tie means 24 may conveniently be a plate, spider, or bar. If the tie means is spider shaped, the studs preferably extend through the different legs of the spider, and if the tie means is a bar, the studs extend through the ends of the bar (if only two studs are employed). Hereafter the tie means will be referred to as a pressure plate, but it will be understood that this term also includes other forms of the tie means.

Referring again to Fig. 1, a toggle assembly 28 is provided extending between the web 18 and the pressure plate 24. The toggle assembly 28 is comprised of a link 29 pivoted on one end to a projection 30 extending from the side of the web 18 toward the enclosure 13, and a link 31 pivoted on one end to a projection 32 extending from the pressure plate 24 toward the web 18. The links 29 and 31 are pivoted at their other ends to form the knee 33 of the toggle assembly and a roller 34 is rotatably mounted on the pin 35 joining the ends of the links 29 and 31 together. Another projection 36 may be provided extending from the pressure plate 24 toward the web 18, the projection 36 engaging an extension 37 on the link 31 when the toggle assembly is in extended position in order to prevent the toggle assembly from attaining a dead center position.

A support member 40 extending into the enclosure 13 is rigidly mounted by means of bolts 41 extending through projections 42 and 43 extending radially inward from the annular member 16 and radially outwardly from the center of web 18 respectively. A support plate 44 is held in a plane parallel to the plane of the aperture 14 between the projections 42 and 43 and the support member 40.

An aperture 50 is provided in the support plate 44, and a metallic bellows 51 mounted on the support plate 50 and extending toward the cover plate 20 has an open end over the aperture 50 and a closed end away from the plate 44. A hood 52 is mounted on the support plate 44 and defines a chamber 53 between the external surface of the bellows 51 and the hood 52. The chamber 53 may be sealed as shown in Fig. 1, or it may be connected by a tube (not shown) to the atmosphere outside of the enclosure.

A cup-shaped perforated spring retaining member 55 is disposed within the bellows 51 and mounted on the plate 44, and a shaft 56 rigidly affixed to the closed end of the bellows 51 extends into the enclosure 13. A coil spring 57 extends between a fixed collar 58 on shaft 56 and the cup-shaped spring retaining member 55. A link 60 is rigidly attached to the threaded end 61 of the shaft 56 within the enclosure 13 by means of nuts 62. A shaft 63 is mounted for rotation in the support member 40, and a link 65 affixed to one end of the shaft 63 is pivotally connected to the link 60 so that relative movement of the shaft 56 into and out of the enclosure 13 imparts a rotational movement to the shaft 63. The shaft 63 is provided with a non-circular portion such as a removed segment portion 66.

An arm 67 is pivoted on a pin 68 held in the support member 40. One end of the arm 67 extends into contacting relationship with the roller 34, and the other end of the arm 67 extends into contacting relationship with the non-circular portion 66 of shaft 63. The non-circular portion of the shaft 63, the arm 67, and the roller 34 are arranged so that forces tending to collapse the toggle assembly 28 result in a rotational moment acting on the arm 67, and this rotational moment is restrained by the bearing of the arms 67 against the shaft 63. Rotation of the shaft 63 beyond a predetermined angular displacement permits the arm 67 to slip past the non-circular portion of the shaft 63 as a result of the rotational moment acting on the arm 67, and rotation of the arm 67 permits the free collapsing of the toggle assembly 28. In Figs. 1 and 3, the toggle assembly 28 is shown restrained from collapse by the arm 67, and in Fig. 4 the toggle assembly 28 is illustrated in collapsed position after rotation of the shaft 63 has permitted rotational movement of the pivoted arm 67.

*Operation*

Initially, in the closed position of the pressure relief device of this invention, as illustrated in Figs. 1 and 3, the angular displacement of shaft 63 is such that the arm 67 is prevented from rotational movement beyond a position where the arm prevents the collapse of the toggle assembly 28. Pressure within the enclosure 13 forcing outwardly on the cover plate 20 provides a toggle collapsing force on the toggle assembly 28 by way of the studs 23 and pressure plate 24. The toggle assembly 28 is prevented from being forced into a dead center position by means of projection 37 on toggle link 31 which bears against the projection 36 of pressure plate 24.

Upon an increase in the pressure within the enclosure 13, the bellows is caused to expand into the chamber 53. This results in a relative movement of the shaft 56 outwardly of the enclosure 13, and the linear movement of the shaft 56 results in the rotational movement of the shaft 63 due to the mechanical linkages 60 and 65 which connects the shafts 56 and 63 together.

If the pressure within the enclosure 13 exceeds a predetermined maximum value, expansion of the bellows 51 results in linear movement of the shaft 56 sufficient to affect the angular displacment of shaft 63 so that the non-circular portion of the shaft 63 no longer restrains movement of the pivoted arm 67. Toggle collapsing forces from pressure within the enclosure 13 acting on the cover plate 20 results in the pivoted arm being forced to rotate about its axis and permit the free collapse of the toggle assembly 28. The collapsed position of the toggle is illustrated in Fig. 4.

In order to limit the maximum opening of the pressure relief device, spacers, such as rubber spacers 70 and fiber spacers 71 may be provided on the studs 23, the spacers limiting the minimum distance between the pressure plate 25 and the web 18.

The operating pressure of the relief device may be varied by adjusting the position of link 60 on shaft 56 by means of the nuts 62, by varying the angular position of link 65 on shaft 63, or by varying the bellows and spring characteristics.

*Resetting*

After the pressure relief device of this invention has opened, it may be reset as follows. First, the bolts 15 are removed and the pressure relief device 10 removed from the enclosed. Then the pressure relief device is placed cover down on a solid surface. This brings the cover plate 20 into contacting relationship with the annular member 16, and also partially expands the toggle. The nuts 27 on the ends of studs 23 are then loosened. Then the arm 67 is rotated to force the toggle assembly 28 into its fully expanded position, rotation being continued until the arm 67 is once again held against rotation by the shaft 63. In rotating the arm 67 past the shaft 63, it may be necessary to apply a slight downward pressure on the shaft 61 to permit the arm 67 to slip past the non-circular portion of the shaft 63. Next, the nuts 27 are tightened to compress the gasket 21. Then the pressure relief device 10 is once again inserted in the aperture 14 and bolted in place with bolts 15.

While the metallic bellows pressure responsive arrangement illustrated in Fig. 1 is the preferred arrangement, it is obvious that other pressure responsive means may be employed to attain the desired rotation of the shaft 63. It is also preferred that the planes of the pressure plate 25 and cover plate 20 be parallel, although this relationship is not absolutely necessary. Similarly, while it is also preferred that the axes of the shafts 63, pin 68 of arm 67, the central pin 35 of the toggle assembly 28 be parallel, other arrangements may also be provided.

In the pressure relief device of this invention, the pressure sensing means is dependent to a minimum extent upon cover holding and frictional forces. Thus the only cover holding force applied to the pressure responsive assembly is the slight friction existing between the non-circular portion of the shaft 63 and the pivoted arm 67.

It will be understood, of course, that, while the form of the invention herein shown and described constitutes the preferred embodiment of the invention, it is not intended herein to illustrate all of the possible equivalent forms or ramifications thereof. It will also be understood that the words used are words of description rather than of limitation and that various changes, such as changes in shape, relative size, and arrangement of parts, may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A pressure relief device for covering an aperture in the wall of an enclosure comprising a cover releasably covering said aperture externally of said enclosure, web means rigidly affixed to said wall extending across said aperture, tie means inside of said enclosure, stud means extending between said tie means and said cover through said web means, toggle means extending between said tie means and said web means, release means, pressure responsive means for providing a movement to said release means in response to variable pressure within said enclosure, and means for releasably preventing collapse of said toggle means comprising a pivoted arm extending between the knee of said toggle means and said release means, said pivoted arm contacting said knee so that toggle collapsing forces on said toggle at said knee provide a moment on said pivoted arm which is releasably restrained by said release means.

2. A pressure relief device for covering an aperture in the wall of an enclosure comprising a cover releasably covering said aperture externally of said enclosure, web means rigidly affixed to the wall extending across said aperture, tie means inside of said enclosure, stud means extending between said tie means and said cover through said web means, toggle means extending between said tie means and said web means, shaft means, pressure responsive means for providing a rotational movement to said shaft means in response to variable pressure within said enclosure, said shaft mean having a non-circular portion, and mean for releasably preventing collapse of said toggle means comprising a pivoted arm extending between the knee of said toggle means and said non-circular portion of said shaft means, said pivoted arm contacting said knee so that toggle collapsing forces on said toggle at said knee provide a moment on said arm, said moment being restrained by said non-circular portion only at predetermined angular displacements thereof.

3. A pressure relief device for covering an aperture in the wall of an enclosure comprising a cover releasably covering said aperture externally of said enclosure, web means rigidly affixed to said wall extending across said aperture, tie means inside of said enclosure, stud means extending between said tie means and said cover through said web means, toggle means extending between said tie means and said web means, shaft means, pressure responsive means for providing a rotational movement to said shaft means in response to variable pressure within said enclosure, said shaft means having a non-circular portion, and means for releasably preventing collapse of said toggle means comprising a pivoted arm extending between the knee of said toggle means and said non-circular portion of said shaft means, said pivoted arm contacting said knee so that toggle collapsing forces on said toggle at said knee provide a moment on said pivoted arm which is releasably restrained by said shaft means.

4. A pressure relief device for covering an aperture in the wall of an enclosure comprising a cover releasably covering said aperture externally of said enclosure, web means rigidly affixed to said wall extending across said aperture, tie means inside of said enclosure, stud means extending between said tie means and said cover through said web means, toggle means extending between said tie means and said web means for releasably holding said cover over said aperture, said toggle means being arranged so that pressure within said closure acting on said cover tends to collapse said toggle means, shaft means, pressure responsive means for providing a rotational movement to said shaft means in response to variable pressure within said enclosure, said shaft means having a non-circular portion, and means for releasably preventing collapse of said toggle means at said knee comprising a pivoted arm extending between the knee of said toggle means and the non-circular portion of said shaft means, said pivoted arm contacting said knee so that toggle collapsing forces on said toggle means provide a moment on said pivot arm which is releasably restrained by said shaft means.

5. A pressure relief device for covering an aperture in the wall of an enclosure comprising a cover releasably covering said aperture externally of said enclosure, web means rigidly affixed to said wall extending across said aperture, tie means inside said enclosure, stud means extending between said tie means and said cover through said web means, toggle means extending between said tie means and web means for releasably holding said cover over said aperture, said toggle means being arranged so that pressure within said enclosure acting on said cover tends to collapse said toggle means, shaft means, pressure responsive means for providing a rotational movement to said shaft means in response to variable pressure within said enclosure, said shaft means having a non-circular portion, and means for releasably preventing collapse of said toggle means comprising a pivoted arm extending between the knee of said toggle means and the non-circular portion of said shaft, said pivoted arm contacting said knee so that toggle collapsing forces on said toggle means at said knee provide a moment on said pivot arm which is restrained by said shaft means and rotation of said shaft means to a position where said pivoted arm may slip past said non-circular portion permits rotation of said pivoted arm and the collapse of said toggle means.

6. A pressure relief device for covering an aperture in the wall of an enclosure comprising annular means disposed about said aperture and removably affixed to said wall externally of said enclosure, said annular means having a central web means extending across said aperture, cover plate means releasably held against said annular means externally of said enclosure for releasably covering said enclosure, tie means within said enclosure, stud means extending between said tie means and said cover plate means through said web means, toggle means extending between said tie means and said web means for releasably holding said cover plate means over said aperture, said toggle means being arranged so that pressure within said enclosure acting on said cover plate means tends to collapse said toggle means, shaft means, pressure responsive means for providing a rotational movement to said shaft means in response to variable pressure within said enclosure, said shaft means having a non-circular portion, and means for releasably preventing collapse of said toggle means comprising a pivoted arm extending between the knee of said toggle means and the non-circular portion of said shaft, said pivoted arm contacting said knee so that toggle collapsing forces on said toggle means at said knee provides a moment on said pivoted arm which is releasably restrained by the non-circular portion of said shaft means.

7. A pressure relief device for covering an aperture in the wall of an enclosure comprising annular means disposed about said aperture and removably affixed to said wall externally of said enclosure, said annular means having a central web means extending across said aperture, cover plate means releasably held against said annular means externally of said enclosure for releasably covering said enclosure, tie means within said enclosure, stud means extending between said tie means and said cover plate means through said web means, toggle means extending between said tie means and web means for releasably holding said cover plate means over said aperture, said toggle means being arranged so that pressure within said enclosure acting on said cover plate means tends to collapse said toggle means, shaft means, pressure responsive means for providing a rotational movement to said shaft means in response to variable pressure within said enclosure, said pressure responsive means comprising bellows means responsive to said pressure and connected to rotate said shaft, said shaft means having a non-circular portion and means for releasably preventing collapse of said toggle means comprising a pivoted arm extending between the knee of said toggle means and the non-circular portion of said shaft, said pivoted arm contacting said knee so that toggle collapsing forces on said toggle means at said knee provides a moment on said pivoted arm which is releasably restrained by the non-circular portion of said shaft means.

8. A pressure relief device for covering an aperture in the wall of an enclosure comprising a cover releasably covering said aperture externally of said enclosure, annular means disposed about said aperture and removably affixed to said wall externally of said enclosure, said annular means having a central web means extending across said aperture, cover plate means releasably held against said annular means externally of said enclosure for releasably covering said enclosure, tie means within said enclosure, stud means extending between said tie means and said cover plate means through said web means, toggle means extending between said tie means and web means for releasably holding said cover plate means over said aperture, said toggle means being arranged so that pressure within said enclosure acting on said cover plate means tends to collapse said toggle means, shaft means, pressure responsive means for providing a rotational movement to said shaft means in response to variable pressure within said enclosure, said shaft means having a non-circular portion, and means for releasably preventing collapse of said toggle means comprising a pivoted arm extending between the knee of said toggle means and the non-circular portion of said shaft, said pivoted arm contacting said knee so that toggle collapsing forces on said toggle means at said knee provide a moment on said pivoted arm which is restrained by said shaft means and rotation of said shaft means to a position where said pivoted arm may slip past said non-circular portion permits rotation of said pivoted arm and the collapse of said toggle means.

9. A pressure relief device for covering an aperture in the wall of an enclosure comprising annular means disposed about said aperture and removably affixed to said wall externally of said enclosure, said annular means having a central web means extending across said aperture, cover plate means releasably held against said annular means externally of said enclosure for releasably covering said enclosure, tie means within said enclosure, said tie means being parallel to said cover plate means, stud means extending between said tie means and said cover plate means, through said web means, toggle means extending between said tie means and said web means for releasably holding said cover plate means over said aperture, said toggle means being arranged so that pressure within said enclosure acting on said cover plate means tends to collapse said toggle means, roller means at the knee of said toggle means, shaft means, pressure responsive means for providing a rotational movement to said shaft means in response to variable pressure in said enclosure, said pressure responsive means comprising bellows means responsive to said pressure and connected to rotate said shaft means, said shaft means having a non-circular portion, and means for releasably preventing collapse of said toggle means comprising a pivoted arm extending between the said roller and the non-circular portion of said shaft means, said pivoted arm contacting said roller so that toggle collapsing forces on said toggle means at said roller provide a moment on said pivoted arm which is restrained by said shaft means and rotation of said shaft means to a position where said pivoted arm may slip past said non-circular portion permits rotation of said pivoted arm and the collapse of said toggle means, the axes of said shaft means, and toggle means, and the pivotal axis of said pivoted arm being substantially parallel.

References Cited in the file of this patent

UNITED STATES PATENTS

| | | |
|---|---|---|
| 2,525,487 | Johnson | Oct. 10, 1950 |
| 2,669,257 | Ramsay | Feb. 16, 1954 |

FOREIGN PATENTS

| | | |
|---|---|---|
| 160,533 | Australia | Jan. 12, 1955 |

UNITED STATES PATENT OFFICE
CERTIFICATE OF CORRECTION

Patent No. 2,869,579                                                    January 20, 1959

Stanley H. Wilk et al.

It is hereby certified that error appears in the printed specification of the above numbered patent requiring correction and that the said Letters Patent should read as corrected below.

Column 5, lines 40 and 41, for "mean", each occurrence, read -- means --; column 6, line 7, strike out "at said knee" and insert the same after "means" in line 11, same column.

Signed and sealed this 5th day of May 1959.

(SEAL)
Attest:

KARL H. AXLINE                                                     ROBERT C. WATSON
Attesting Officer                                            Commissioner of Patents